United States Patent Office 3,279,911
Patented Oct. 18, 1966

3,279,911
HERBICIDAL COMPOSITIONS COMPRISING CYANOALKYL HALOARYLOXYACRYLATES
Lee A. Miller, Kirkwood, Mo., assignor to Monsanto Company, a corporation of Delaware
No Drawing. Filed Oct. 16, 1963, Ser. No. 316,500
8 Claims. (Cl. 71—2.6)

This application is a continuation-in-part of my application Serial No. 152,615, filed November 15, 1961, now U.S. Patent No. 3,148,204.

This invention relates to unsaturated esters, and to the uses thereof in biological toxicant compositions, for example, in herbicidal compositions.

It is an object of this invention to provide methods for controlling the growth of undesired plant life by the application to the seeds of such undesired plants a toxicant composition containing as an essential active ingredient at least one cyanoalkyl haloaryloxyacrylate compound. Other objects, aspects, and advantages of the invention are apparent from a consideration of the accompanying disclosure and the appended claims.

Cyanoalkyl haloaryloxyacrylates are prepared by reacting a halogenated phenolic compound containing from 1 to 5 halogen atoms in the molecule, said halogen atoms being selected from the group consisting of chlorine, bromine, and iodine, with a cyanoalkyl propiolate having from 2 to 6 carbon atoms in the alkyl portion of the cyanoalkyl radical, in the presence of a basic catalyst.

The present invention provides new uses for compounds of the formula

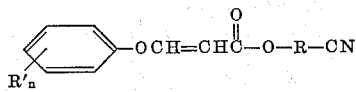

wherein R is a bivalent alkylene radical of from 2 to 6 carbon atoms, R' is a halogen selected from the group consisting of chlorine, bromine, and iodine, and $n$ is an integer of from 1 to 5.

According to the present invention there are provided methods for controlling undesired plant life, by the application to the seeds of such undesired plant life a toxic composition containing as an essential active ingredient at least one cyanoalkyl haloaryloxyacrylate compound.

The cyanoalkyl propiolates which are employed for the preparation of the present cyanoalkyl haloaryloxyacrylates are obtained by the reaction of a cyanoalkanol with propiolic acid or an acyl halide or an anhydride thereof, the reaction with, for example, propiolyl chloride proceeding as follows:

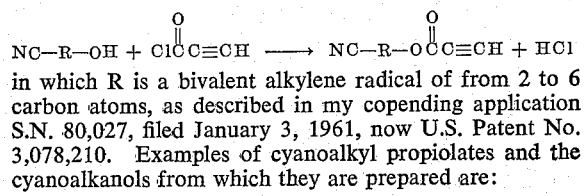

in which R is a bivalent alkylene radical of from 2 to 6 carbon atoms, as described in my copending application S.N. 80,027, filed January 3, 1961, now U.S. Patent No. 3,078,210. Examples of cyanoalkyl propiolates and the cyanoalkanols from which they are prepared are:

2-cyanoethyl propiolate from hydracrylonitrile;
2-cyano-1-methylethyl propiolate from 3-hydroxybutyronitrile;
3-cyanopropyl propiolate from 4-hydroxybutyronitrile;
2-cyano-1,1-dimethylethyl propiolate from 2,2-dimethylhydracrylonitrile;
4-cyanobutyl propiolate from 5-hydroxyvaleronitrile;
2-cyano-1-ethylethyl propiolate from 3-hydroxyvaleronitrile;
5-cyanopentyl propiolate from 6-hydroxyhexanenitrile;
4-cyano-1-methylbutyl propiolate from 5-hydroxyhexanenitrile; and
6-cyanohexyl propiolate from 7-hydroxyheptanenitrile.

Suitable halogenated phenolic compounds that may be reacted with a cyanoalkyl propiolate of the above defined types to produce the compounds of their invention include the isomeric monochlorophenols, isomeric monobromophenols, and the isomeric monoiodophenols, 2,4-dichlorophenol, 2,5-dichlorophenol, 2,6-dichlorophenol, 2,4,5-trichlorophenol, 2,4-dibromophenol, 2,4,5-tribromophenol, 2,4,6-trichlorophenol, 2,4-diiodophenol, pentachlorophenol, pentabromophenol. To prepare the compounds of this invention it is essential that there be at least one halogen substituent attached to the phenolic nucleus.

The present compounds are for the most part solid crystalline materials. These compounds can be used for a variety of chemical and industrial purposes. As will be shown hereinafter, the present cyanoalkyl 3-(halo-substituted aryloxy)acrylates are characterized by high biological toxicant activities, specifically against various undesired types of plant life and hence are effective herbicidal chemicals. By the practice of this invention it is possible to synthesize monomeric materials which can be converted to polymers having biological toxicant activity. These materials when added to soil for use as herbicides or for use as specific plant toxicants have the added feature of having an abnormally slow decomposition rate so that they have a comparatively long effective life. Many of these compounds produced by the process of this invention have unusual activity as selective herbicides when used in the monomeric form.

Examples of compounds within the scope of this invention and the reactants from which they are obtained are, for example, 2-cyanoethyl 3-(4-chlorophenoxy)acrylate from 2-cyanoethyl propiolate and 4-chlorophenol;
3-cyanopropyl 3-(2,4,5-tribromophenoxy)acrylate from 3-cyanopropyl propiolate and 2,4,5-tribromophenol;
4-cyanobutyl 3-(pentachlorophenoxy)acrylate from 3-cyanobutyl propiolate and pentachlorophenol;
5-cyanopentyl 3-(2,4-diiodophenoxy)acrylate from 5-cyanopentyl propiolate and 2,4-diiodophenol;
6-cyanohexyl 3-(2,3,4,6-tetrachlorophenoxy)acrylate from 6-cyanohexyl propiolate and 2,3,4,6-tetrachlorophenol;
2-cyanoethyl 3-(pentachlorophenoxy)acrylate from 2-cyanoethyl propiolate and pentachlorophenol;
3-cyanopropyl 3(2,4,6-triiodophenoxy)acrylate from 3-cyanopropyl propiolate and 2,4,6-triiodophenol; and
2-cyanoethyl 3-(pentabromophenoxy)acrylate from 2-cyanoethyl propiolate and pentabromophenol.

Other useful compounds within the scope of this invention are those obtained from cyanoalkyl propiolates and halophenols containing additional substituents attached to the aromatic nucleus, for example;

2-cyanoethyl 3-(4-chloro-2-methylphenoxy)acrylate from 2-cyanoethyl propiolate and 4-chloro-2-methylphenol;
3-cyanopropyl 3-(2 - chloro-4-tert-butylphenoxy)acrylate from 3-cyanopropyl propiolate and 2-chloro-4-tert-butylphenol;
6-cyanohexyl 3-(3 - bromo-4 - dodecylphenoxy)acrylate from 6-cyanohexyl propiolate and 3-bromo-4-dodecylphenol;
4-cyanobutyl 3-(2-chloro-4-nitrophenoxy)acrylate from 4-cyanobutyl propiolate and 2-chloro-4-nitrophenol; and
2-cyanoethyl 3(2,4,5-triiodo-3-nitrophenoxy)acrylate from 2-cyanoethyl propiolate and 2,4,5-triiodo-3-nitrophenol.

In order to illustrate some of the various aspects and advantages of the invention, illustrative examples are given herein. It will, of course, be understood that variations in the particular phenolic compounds, reaction proportions, temperatures, pressures, and the like can be made without departing from the scope of the invention.

Example 1

2-cyanoethyl propiolate was prepared as follows:

A mixture consisting of 14.2 grams (0.2 mole) of hydracrylonitrile, 15.4 grams (0.22 mole, 10% excess) of propiolic acid, 0.5 g. of 4-toluenesulfonic acid and 150 ml. of benzene was stirred at reflux under a Dean-Stark apparatus for 4.5 hours. During this time 3.4 ml. (95% of theory) of water had collected. The reaction mixture was allowed to cool and then washed with 10% aqueous sodium bicarbonate and water. It was evaporated to remove solvent and subsequently distilled to give the substantially pure 2-cyanoethyl propiolate, B.P. 127° C./25 mm., $n_D^{25}$ 1.4500, which analyzed as containing 58.32% carbon and 4.34% hydrogen as compared with 58.53% carbon and 4.09% hydrogen, the calculated values. Infrared analysis showed the following structures:

$\equiv$CH at 3300 cm.$^{-1}$
CH$_2$ at 3000 cm.$^{-1}$
C$\equiv$N at 2260 cm.$^{-1}$
C$\equiv$CH at 2120 cm.$^{-1}$
C$=$O at 1725 cm.$^{-1}$
C—O ester at 1240 cm.$^{-1}$ A mixture of 6.15 grams of 2-cyanoethyl propiolate (0.05 mole), 8.15 g. of 2,4-dichlorophenol (0.05 mole), 100 ml. of benzene, and 5 drops of N-methylmorpholine was heated to reflux for 12 hours. The resulting reaction mixture was evaporated to give 15.8 g. of crude 2-cyanoethyl 3-(2,4-dichlorophenoxy)acrylate. This product was purified by recrystallization from ethanol to obtain a pure product, M.P. 63–64° C., which analyzed as containing 50.58% carbon and 3.30% hydrogen as compared with 50.37% carbon and 3.17% hydrogen for $C_{12}H_9Cl_2NO_3$. Infrared analysis of the product was as follows:

| Cm.$^{-1}$ | Function Indicated |
|---|---|
| 2270 | C$\equiv$N |
| 1725 | C$=$O ester |
| 1652 | C$=$C |
| 1268⟩ ⟨1250⟩ | C—O ether |
| 1112 | C—O—C |
| 705 | C—Cl |
| 865 | 1 adjacent hydrogen on the phenyl ring. |
| 818 | 2 adjacent hydrogens on the phenyl ring. |

The infrared results are consistent with the proposed structure of 2-cyanoethyl 3-(2,4-dichlorophenoxy)acrylate.

Example 2

This example shows evaluation of the 2-cyanoethyl 3-2,4-dichlorophenoxy)acrylate of Example 1 as a selective preemergent herbicide. Briefly, the chemical is applied in spray form to soil seeded with representative grasses and broad-leaf plants.

Aluminum pans were filled level with a good grade of top soil which had been screened through a ¼" wire mesh. The soil surface was then compacted to a depth of ⅜" from the top of the pan. A predetermined number of seeds each of morning glory, wild oat, brome grass, foxtail, crab grass, rye grass, radish, sugar beet, soybean, wild buckwheat, tomato, sorghum and pigweed were scattered on the soil surface and covered with soil to the pan top.

The planted pans, except for controls, were sprayed with an aliquot of an organic solvent containing the chemical to be tested. The tests were made at the rate of 5 lbs. per acre. After spraying, the pans were placed on sand in a bench in the greenhouse and the bench flooded with water to ½" above the sand level. The test pans of soil were allowed to absorb moisture through the perforated bottom until the surface was about ½ moist. The excess water was then drained off below the bench sand level. The surface of the test pans rapidly became completely moist by capillary action and was maintained adequately wet by sub-irrigation for the two-week test period.

Observation of the pans at the end of that time showed that those which had been sprayed with the solution of the 2-cyanoethyl 3-(2,4-dichlorophenoxy)acrylate at a rate of 2 pounds/acre showed complete supression of bromegrass, foxtail, crabgrass, pigweed and sorghum. Sugar beets, soybean, and tomato were not at all injured, whereas wild oat, radish, wild buckwheat, showed from slight to moderate injury. On the other hand, the seeds which had been planted in the pan that had not been sprayed with the present test compound had emerged and the plants were in excellent condition.

In subsequent tests, the concentration of the test compound was progressively decreased to as little as ¼ of a pound per acre. At this concentration the foxtail, crabgrass and pigweed failed to emerge, whereas morning glory, sugar beet, wild oat, bromegrass, ryegrass, radish, soybean, wild buckwheat, tomato and sorghum were not at all effected. The 2-cyanoethyl 3-(2,4-dichlorophenoxy)acrylate thus was selective at the low concentration; moreover, at the low concentration it inhibited germination of crabgrass while not affecting the other grasses.

The present cyanoalkyl 3-aryloxyacrylates are characterized by a high degree of efficacy in that they possess selective preemergent herbicidal efficacy at very low concentrations.

The solid formulations, frequently referred to as "dusts" may contain in addition to the active ingredient, diluents or extenders, dispersing agents to prevent local high concentrations, and agents to facilitate distribution in soil or soil waters. Suitable solid diluents are those which render the compositions permanently dry and free flowing. Thus hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate, and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger if it is mixed with the surface soil by means of a disk-plow or harrow at the time of application.

The liquid compositions for herbicidal use may be solutions, or other liquid dispersions. The choice of a liquid medium will depend to some extent upon the physical properties of the active ingredient. The cyanoalkyl 3-aryloxyacrylates may be water-soluble and mere dissolution will then provide a usable formulation. Often the cyanoalkyl 3-aryloxyacrylates are only limitedly soluble in water and therefore aqueous formulations will necessarily be dispersions of minute drops of the water-insoluble substances in suspension in an aqueous medium. The water-insoluble compounds used in this invention may first be dissolved in a suitable organic solvent and the organic solution of the active ingredient then incorporated in water or in any aqueous medium to produce a heterogenous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefitted by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, either liquid or solid in physical state. Thus a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

I claim:
1. A method for controlling the growth of undesired plant life which comprises applying to the seeds of such undesired plants a toxic amount of at least one cyanoalkyl haloaryloxyacrylate compound of the formula

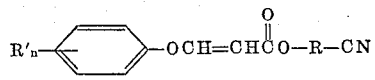

wherein R is a bivalent alkylene radical of from 2 to 6 carbon atoms, R' is a halogen selected from the group consisting of chlorine, bromine, and iodine, and $n$ is an integer of from 1 to 5.

2. A method according to claim 1 wherein the cyanoalkyl haloaryloxyacrylate compound is applied to soil containing the seeds of the undesired plant life.

3. A method according to claim 1 wherein the cyanoalkyl chlorophenoxyacrylate compound has the formula

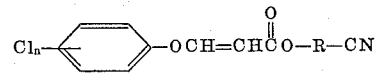

wherein R is a bivalent alkylene radical of from 2 to 6 carbon atoms, and $n$ is an integer of from 1 to 5.

4. A method according to claim 3 wherein the cyanoethyl chlorophenoxyacrylate is a compound of the formula

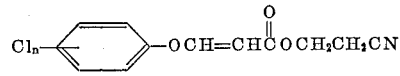

wherein $n = 1$ to 5.

5. A method according to claim 4 wherein the cyanoethyl chlorophenoxyacrylate is 2-cyanoethyl 3-(2,4-dichlorophenoxy)acrylate.

6. A herbicidal composition comprising 0.05 to 10 weight percent of a surface active agent, in an inert carrier, and a toxic amount of a cyanoalkyl haloaryloxyacrylate compound of the formula of claim 1.

7. A herbicidal composition of claim 6, wherein the herbicidal active component is a cyanoalkyl chlorophenoxyacrylate.

8. A herbicidal composition of claim 6, wherein the herbicidal active component is 2-cyanoethyl 3-(2,4-dichlorophenoxy)acrylate.

References Cited by the Examiner
UNITED STATES PATENTS
2,390,941   12/1945   Jones _____ 71—2.6
3,036,112   5/1962    Lynn _____ 71—2.6 X LEWIS GOTTS, *Primary Examiner.*

JAMES O. THOMAS, *Examiner.*

A. J. ADAMCIK, *Assistant Examiner.*